(12) United States Patent
Kawara

(10) Patent No.: US 10,490,985 B2
(45) Date of Patent: Nov. 26, 2019

(54) WIRING HARNESS FIXING STRUCTURE

(71) Applicant: JTEKT CORPORATION, Osaka-shi, Osaka (JP)

(72) Inventor: Takeshi Kawara, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 91 days.

(21) Appl. No.: 15/816,086

(22) Filed: Nov. 17, 2017

(65) Prior Publication Data

US 2018/0152011 A1 May 31, 2018

(30) Foreign Application Priority Data

Nov. 25, 2016 (JP) ................................. 2016-229213

(51) Int. Cl.
| | | |
|---|---|---|
| *H02G 3/04* | (2006.01) | |
| *H02G 3/06* | (2006.01) | |
| *H02G 3/08* | (2006.01) | |
| *B60R 16/02* | (2006.01) | |
| *F02F 7/00* | (2006.01) | |
| *B62D 5/04* | (2006.01) | |
| *H01B 7/00* | (2006.01) | |

(52) U.S. Cl.
CPC ....... *H02G 3/0456* (2013.01); *B60R 16/0215* (2013.01); *B62D 5/0406* (2013.01); *F02F 7/0068* (2013.01); *H01B 7/0045* (2013.01); *H02G 3/0487* (2013.01); *H02G 3/0608* (2013.01)

(58) Field of Classification Search
CPC ................ H02G 3/0487; H02G 3/0608; B60R 16/0215; F02F 7/0068

USPC ......... 248/68.1, 73, 74.1; 174/97, 101, 68.1, 174/48.1, 72 A
See application file for complete search history.

(56) References Cited

U.S. PATENT DOCUMENTS 5,271,585 A * 12/1993 Zetena, Jr. ........... G02B 6/4459
 174/95
5,739,470 A 4/1998 Takeda
6,861,589 B2 * 3/2005 Katsumata ........... H02G 3/0487
 174/68.3

(Continued)

FOREIGN PATENT DOCUMENTS

DE 70 15 776 U 11/1970
EP 0 998 000 A2 5/2000
(Continued)

OTHER PUBLICATIONS

Apr. 11, 2018 Search Report issued in European Patent Application No. 17202955.5.

*Primary Examiner* — Tan Le
(74) *Attorney, Agent, or Firm* — Oliff PLC

(57) ABSTRACT

Provided is a wiring harness fixing structure that prevents a wiring harness from projecting outward from an opening of a trough-shaped holding member attached and fixed to an attachment object. A wiring harness fixing structure includes a holding member that is formed into a trough shape with an opening provided on one face and is configured to hold a part or all of a wiring harness, and an attachment fitting configured to attach and fix the holding member to a housing. The holding member is attached and fixed to the housing by using the attachment fitting so that the opening is oriented to the outer face of the housing.

9 Claims, 9 Drawing Sheets

(56) References Cited

U.S. PATENT DOCUMENTS

| | | | |
|---|---|---|---|
| 8,124,887 B2* | 2/2012 | Suzuki | B60R 16/0215 |
| | | | 174/481 |
| 9,303,792 B2* | 4/2016 | Heims | H02G 3/32 |
| 9,520,702 B2* | 12/2016 | Sugimoto | H02G 3/0468 |
| 10,208,705 B2* | 2/2019 | Takahata | B60R 16/0215 |
| 2004/0232287 A1* | 11/2004 | Rosemann | F16L 3/02 |
| | | | 248/68.1 |
| 2016/0229357 A1 | 8/2016 | Renner | |

FOREIGN PATENT DOCUMENTS

| | | |
|---|---|---|
| EP | 2 879 252 A1 | 6/2015 |
| JP | S62-084558 U | 5/1987 |
| JP | 2007-242283 A | 9/2007 |
| JP | 2012-217226 A | 11/2012 |

\* cited by examiner

WIRING HARNESS FIXING STRUCTURE

INCORPORATION BY REFERENCE

The disclosure of Japanese Patent Application No. 2016-229213 filed on November 25 including the specification, drawings and abstract, is incorporated herein by reference in its entirety.

BACKGROUND OF THE INVENTION

1. Field of the Invention

The present invention relates to a wiring harness fixing structure configured to fix a wiring harness.

2. Description of the Related Art

Hitherto, wiring harness fixing structures configured to fix wiring harnesses are known (see, for example, Japanese Patent Application Publication No. 2012-217226 (JP 2012-217226 A)). The fixing structure includes an exterior protection member, anchor portions, and attachment holes. The exterior protection member extends in a longitudinal direction, and is formed to have such a size and shape as to cover the entire wiring harness. The exterior protection member is formed into a trough shape with its sectional shape open on one end face. Thus, the exterior protection member can hold the wiring harness. The exterior protection member has a bottom wall, two lateral walls, and an opening. The lateral walls extend from both ends of the bottom wall, and face each other. The opening faces the bottom wall.

The anchor portions are arranged on the exterior protection member at a plurality of positions with predetermined intervals along the longitudinal direction. The anchor portions are provided side by side in the longitudinal direction on one of the two lateral walls of the exterior protection member. The anchor portions are inserted into and engaged with holes provided in an object to which the exterior protection member is attached (hereinafter referred to as an attachment object). The exterior protection member is attached and fixed to the attachment object via the anchor portions in a state in which one of the two lateral walls is in contact with the attachment object.

When the exterior protection member is attached to the attachment object in the state in which one of the two lateral walls is in contact with the attachment object, the opening of the exterior protection member is not oriented to the attachment surface of the attachment object, but to a direction orthogonal to the normal to the attachment surface. In this fixing structure, when the wiring harness held by the exterior protection member is deflected, the wiring harness is likely to project outward from the opening of the exterior protection member. As a result, the wiring harness may bulge unnecessarily.

SUMMARY OF THE INVENTION

It is one object of the present invention to provide a wiring harness fixing structure that prevents a wiring harness from projecting outward from an opening of a trough-shaped holding member attached and fixed to an attachment object.

A wiring harness fixing structure according to one aspect of the present invention includes a holding member and an attachment fitting. The holding member is formed into a trough shape with an opening provided on one face, and is configured to hold a part or all of a wiring harness. The attachment fitting is configured to attach and fix the holding member to an attachment object. The holding member is attached and fixed to the attachment object by using the attachment fitting so that the opening is oriented to an outer face of the attachment object.

According to this structure, the wiring harness is surrounded by the trough-shaped holding member and the outer face of the attachment object. Therefore, the route of the wiring harness can be regulated, and the wiring harness can be housed in the holding member without significantly deflecting and bulging the wiring harness. Thus, the wiring harness can be prevented from projecting out of the trough-shaped holding member from the opening of the holding member.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A wiring harness fixing structure according to a specific embodiment of the present invention is described below with reference to the drawings.

Figure 1:
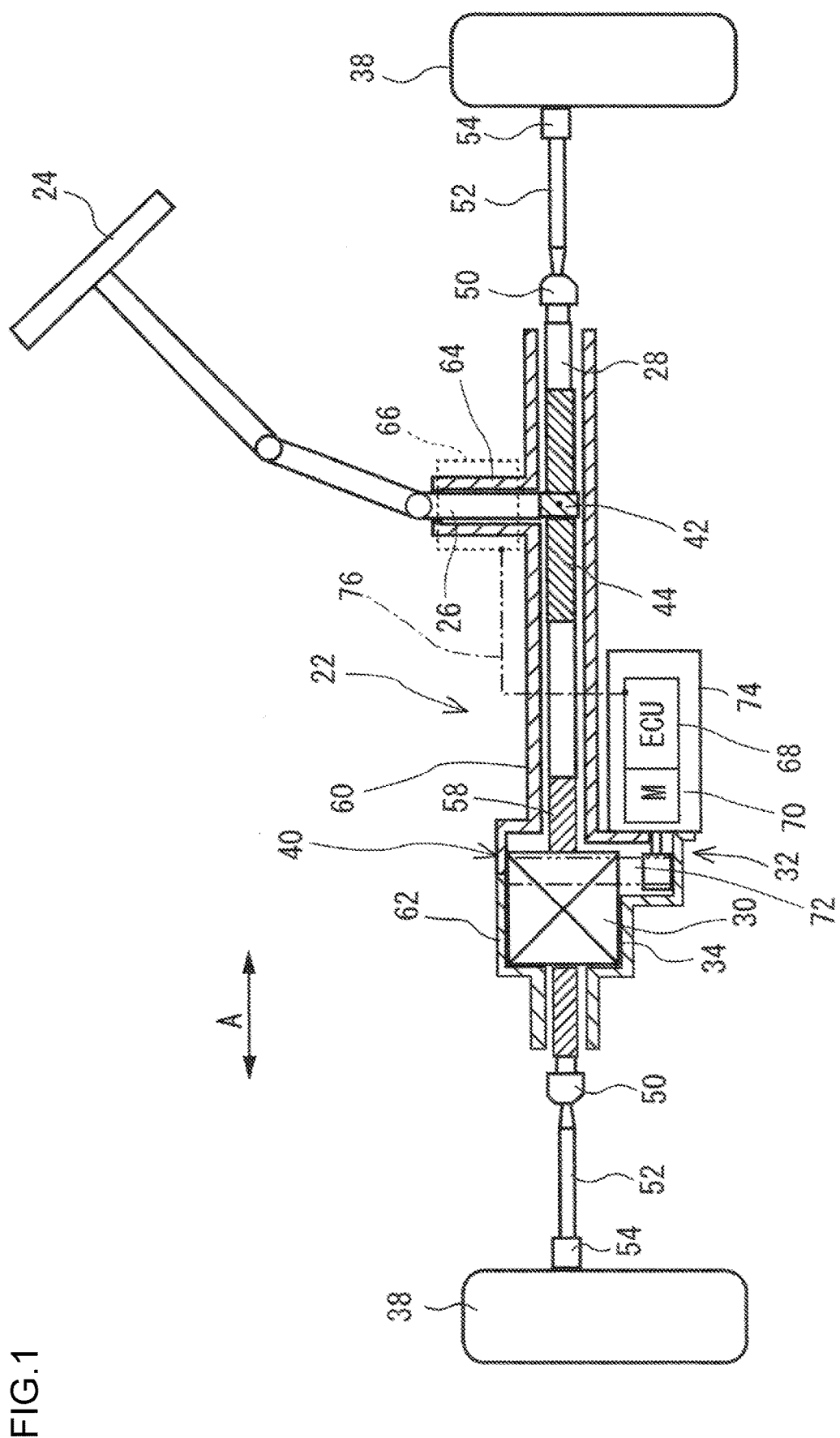
FIG. 1 is an overall structural view of an apparatus including a wiring harness fixing structure according to a first embodiment of the present invention.
Figure 2:
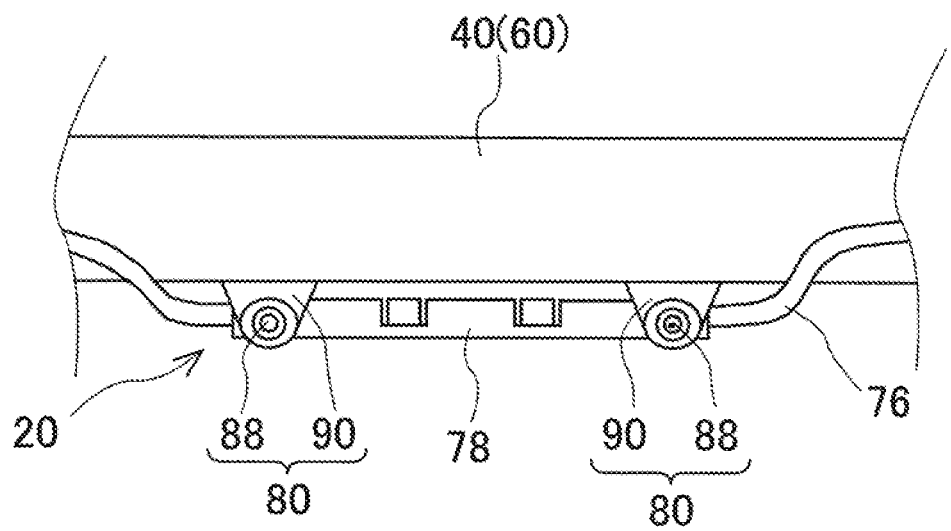
FIG. 2 is a top view of the wiring harness fixing structure of the first embodiment.
Figure 3:
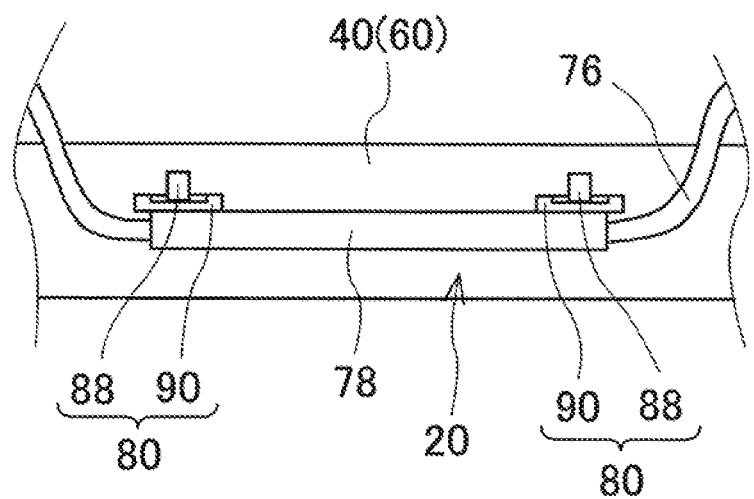
FIG. 3 is a side view of the wiring harness fixing structure of the first embodiment.
Figure 4:
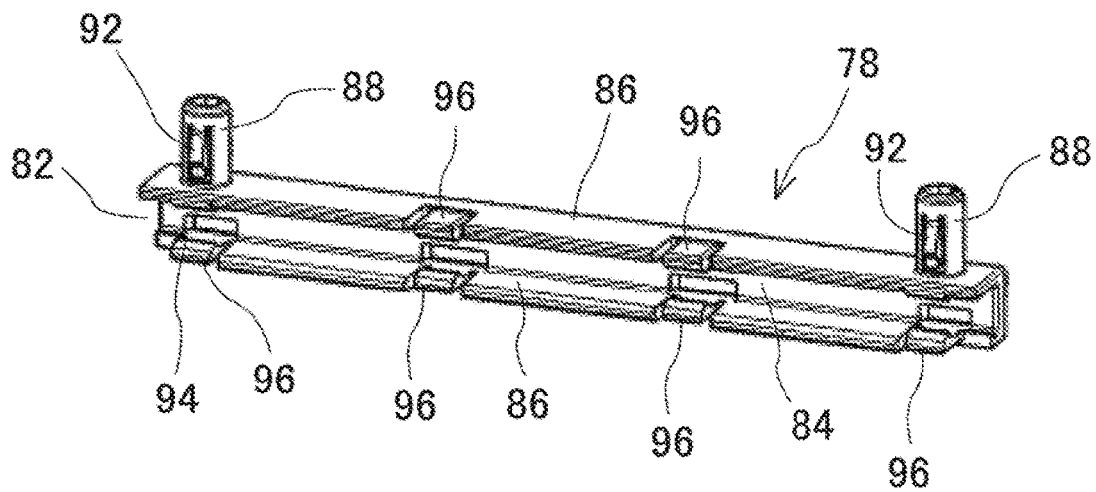
FIG. 4 is a perspective view of a holding member provided in the wiring harness fixing structure of the first embodiment when viewed from an opening side.

FIG. 1 is an overall structural view of an apparatus 22 including a wiring harness fixing structure 20 according to a first embodiment of the present invention. The apparatus 22 is a vehicle electric power steering system capable of assisting a steering torque by an assist torque from an electric motor.

The apparatus 22 includes a steering wheel 24, a steering shaft 26, a steering operation shaft 28, a ball screw mechanism 30, a steering assist device 32, and a bearing unit 34. The apparatus 22 is an apparatus configured to turn steered wheels 38 coupled to both ends of the steering operation shaft 28 by moving the steering operation shaft 28 along an axial direction A of the steering operation shaft 28.

The steering wheel 24 is provided in a vehicle cabin, and is supported rotatably. The steering wheel 24 rotates through a rotational operation performed by a driver of the vehicle. One end of the steering shaft 26 is coupled to the steering wheel 24. The steering shaft 26 is rotatably held by a housing 40 fixed to a vehicle body. The steering shaft 26 rotates along with the rotation of the steering wheel 24.

A pinion 42 constituting a rack and pinion mechanism is formed at the other end of the steering shaft 26. A rack 44 is formed on the steering operation shaft 28. The rack 44 constitutes the rack and pinion mechanism together with the pinion 42. The rack 44 is provided at a position closer to one of the ends of the steering operation shaft 28. The pinion 42 of the steering shaft 26 and the rack 44 of the steering operation shaft 28 mesh with each other. The steering shaft 26 transmits, to the steering operation shaft 28, a torque applied to the steering wheel 24 through the rotational operation performed by the driver of the vehicle. The steering operation shaft 28 extends in a vehicle width direction. The steering operation shaft 28 moves in the axial direction A, that is, the vehicle width direction, along with the rotation of the steering shaft 26.

Tie rods 52 are pivotably coupled to both ends of the steering operation shaft 28 via ball joints 50. The steered wheels 38 are coupled to the tie rods 52 via knuckle arms 54. The steered wheels 38 are turned through the movement of the steering operation shaft 28 in the axial direction A. Through the turning of the steered wheels 38, the vehicle is steered rightward or leftward.

The ball screw mechanism 30 includes a ball screw portion 58 and a ball screw nut (not illustrated). The ball screw portion 58 is an outer peripheral groove formed on the outer peripheral surface of the steering operation shaft 28 by being helically turned a plurality of times.

The steering operation shaft 28 is inserted through and held by the housing 40 so as to be movable in the axial direction A. The housing 40 is formed into a tubular shape. The housing 40 has a small-diameter portion 60 and a large-diameter portion 62. The small-diameter portion 60 has a bore diameter slightly larger than the outside diameter of the steering operation shaft 28. A steering shaft insertion portion 64 is coupled to the small-diameter portion 60. The steering shaft 26 is inserted through the steering shaft insertion portion 64. The large-diameter portion 62 has a bore diameter larger than the bore diameter of the small-diameter portion 60. The large-diameter portion 62 houses the ball screw mechanism 30 and a driving force transmission mechanism that is described later.

The steering assist device 32 is arranged mainly in a radial direction of the ball screw mechanism 30. The steering assist device 32 includes a torque sensor 66, an electronic control unit (hereinafter referred to as an ECU) 68, an electric motor 70, and a driving force transmission mechanism 72. The torque sensor 66 is provided on the steering shaft 26. The ECU 68 and the electric motor 70 are housed in a case 74 fixed in the vicinity of the large-diameter portion 62 of the housing 40. The ECU 68 and the electric motor 70 are provided in the case 74 so as to be adjacent to each other. The electric motor 70 is arranged so that its output shaft is parallel to the axial direction A of the steering operation shaft 28. The torque sensor 66 is electrically connected to the ECU 68 via a wiring harness 76 having power supply wires and signal wires bound together. Signals output from the torque sensor 66 are supplied to the ECU 68.

The ECU 68 detects a torque applied to the steering wheel 24 based on a signal input from the torque sensor 66. The ECU 68 controls power to be output from the electric motor 70 by setting an assist torque from the electric motor 70 based on the detected torque. The electric motor 70 generates the assist torque in response to a command from the ECU 68. The assist torque generated by the electric motor 70 is transmitted to the driving force transmission mechanism 72.

The driving force transmission mechanism 72 has a structure in which an input side is connected to the output shaft of the electric motor 70 and an output side is connected to an outer peripheral side of the ball screw nut. When the assist torque is transmitted from the electric motor 70 to the driving force transmission mechanism 72, the ball screw nut of the ball screw mechanism 30 is driven to rotate, thereby moving the steering operation shaft 28 in the axial direction A via a plurality of rolling balls.

In the apparatus 22, when the steering wheel 24 is operated, a steering torque is transmitted to the steering shaft 26, and the steering operation shaft 28 is moved in the axial direction via the rack and pinion mechanism including the pinion 42 and the rack 44. The steering torque transmitted to the steering shaft 26 is detected by the ECU 68 with the torque sensor 66. The ECU 68 controls power to be output from the electric motor 70 based on the steering torque, the rotational position of the electric motor 70, and the like. The electric motor 70 generates an assist torque in response to a command from the ECU 68. The assist torque is converted to a driving force for moving the steering operation shaft 28 in the axial direction via the ball screw mechanism 30.

When the steering operation shaft 28 is moved in the axial direction, the directions of the steered wheels 38 are changed via the ball joints 50, the tie rods 52, and the knuckle arms 54. According to the apparatus 22, the assist torque generated by the electric motor 70 based on the steering torque transmitted to the steering shaft 26 can be provided to the axial movement of the steering operation shaft 28. Thus, it is possible to reduce the steering force required when the driver operates the steering wheel 24.

The wiring harness fixing structure 20 is described with reference to FIG. 2 to FIG. 11 in addition to FIG. 1. The wiring harness fixing structure 20 is a structure configured to attach and fix a holding member to an attachment object of the apparatus 22. The holding member holds the wiring harness 76 that electrically connects the torque sensor 66 and the ECU 68 of the apparatus 22 to each other. The attachment object to which the wiring harness 76 is attached and fixed is located at a part of the housing 40 between the steering shaft insertion portion 64 through which the steering shaft 26 provided with the torque sensor 66 is inserted and the vicinity of the large-diameter portion 62 to which the case 74 that houses the ECU 68 is fixed. The wiring harness 76 is mainly routed along a longitudinal part of the housing 40 that covers the steering operation shaft 28 extending in the axial direction A. That is, the wiring harness 76 is routed along the tubular small-diameter portion 60 that connects the steering shaft insertion portion 64 and the large-diameter portion 62 to each other.

The wiring harness fixing structure 20 includes a holding member 78 and attachment fittings 80. The holding member 78 holds the wiring harness 76 that electrically connects the torque sensor 66 and the ECU 68 to each other. The attachment fittings 80 attach and fix the holding member 78 to the small-diameter portion 60 of the housing 40.

The holding member 78 linearly extends to have such a size and shape as to cover the outer peripheral surface of a part of the entire wiring harness 76 in its longitudinal direction (specifically, a part between the steering shaft insertion portion 64 side and the large-diameter portion 62 side). The holding member 78 is formed of a resin or the like that is easy to mold. The holding member 78 is arranged so as to extend in the axial direction A of the steering operation shaft 28 along the surface of the small-diameter portion 60 of the housing 40. The holding member 78 covers a part of the wiring harness 76 over the longitudinal direction, thereby exerting a function of preventing the wiring harness 76 from being deflected and bulged significantly.

Figure 5:
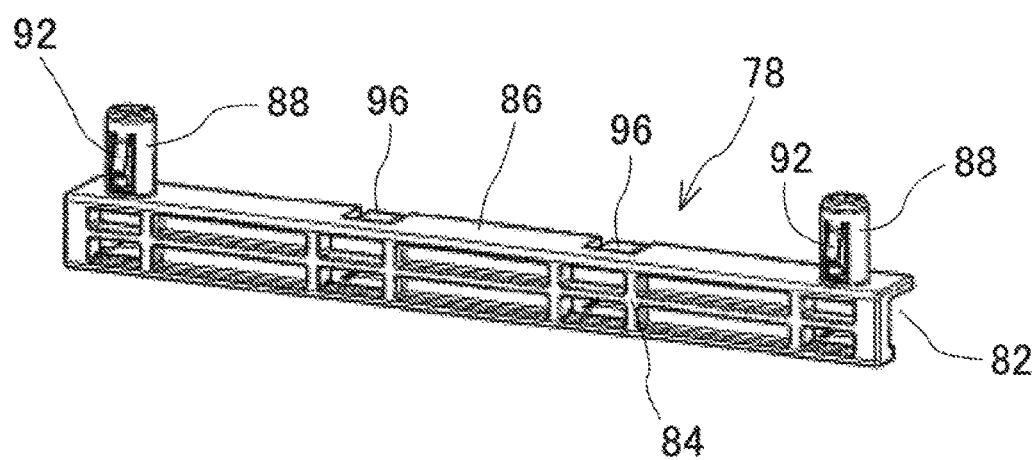
FIG. 5 is a perspective view of the holding member provided in the wiring harness fixing structure of the first embodiment when viewed from a side opposite to the opening.
Figure 6:
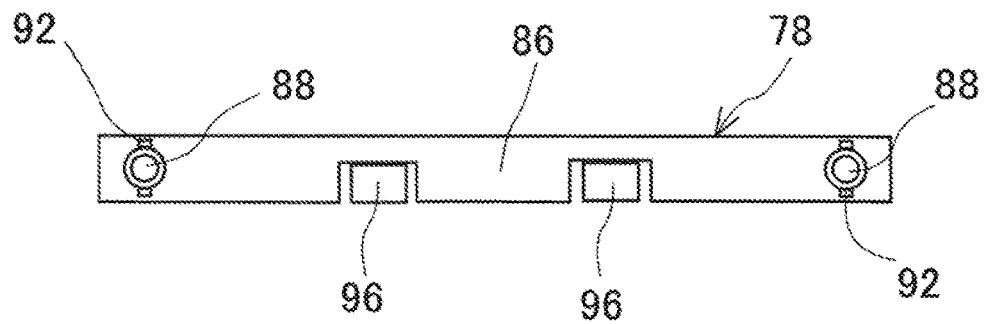
FIG. 6 is a top view of the holding member provided in the wiring harness fixing structure of the first embodiment.
Figure 7:
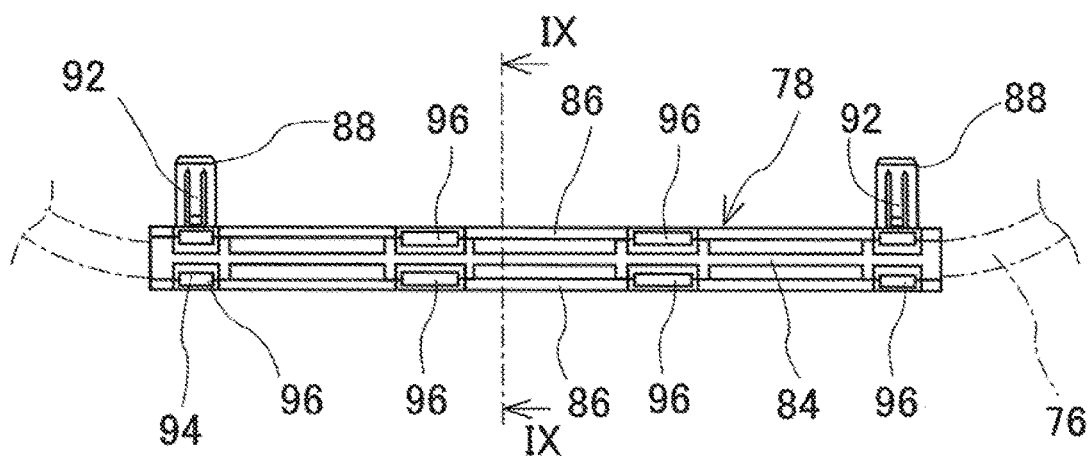
FIG. 7 is a side view of the holding member provided in the wiring harness fixing structure of the first embodiment when viewed from the opening side.
Figure 8:
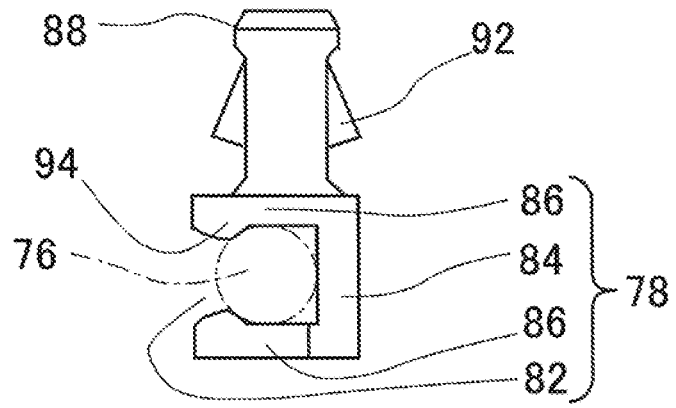
FIG. 8 is a side view of the holding member provided in the wiring harness fixing structure of the first embodiment when viewed from the outside in a longitudinal direction.
Figure 9:
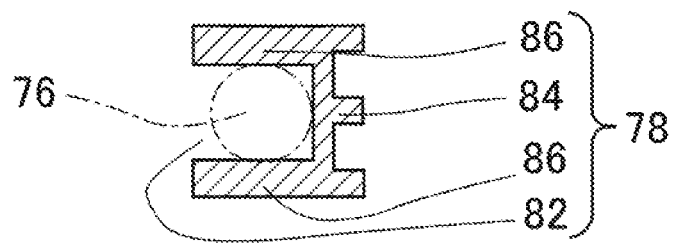
FIG. 9 is a sectional view of the holding member illustrated in FIG. 7, which is taken along the line IX-IX.
Figure 10:
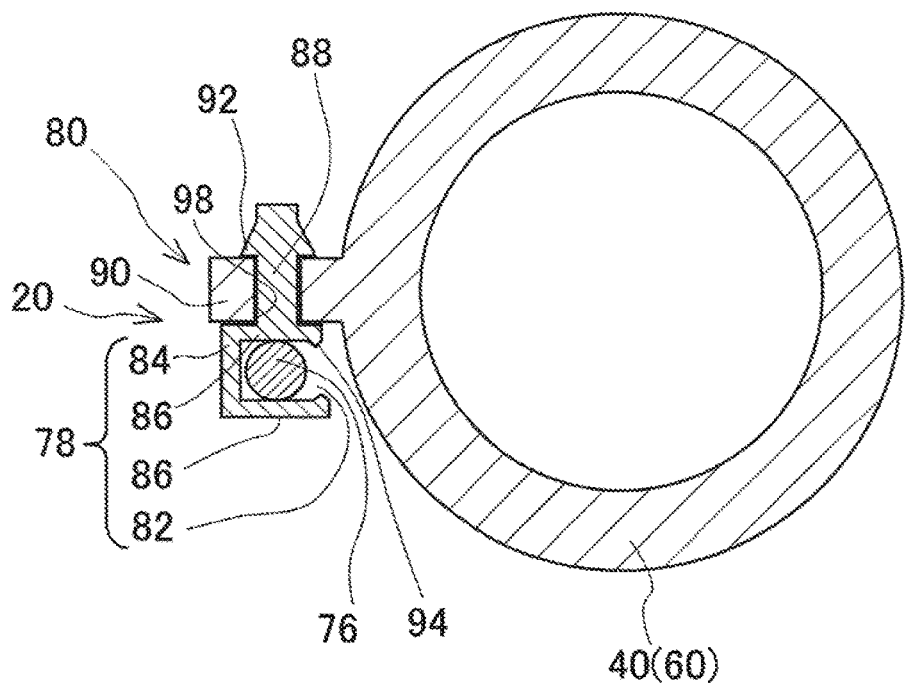
FIG. 10 is a schematic view of the wiring harness fixing structure of the first embodiment.

The holding member 78 is formed into a U-shape in cross section, in which one side is cut away, and is also formed into a trough shape with an opening 82 provided on one face. The opening 82 is provided on the same face over the entire holding member 78 in its longitudinal direction. The holding member 78 has the opening 82, a bottom 84, and lateral walls 86 on its four faces. The bottom 84 faces the opening 82. The lateral walls 86 extend from both ends of the bottom 84. The holding member 78 may be formed so that the bottom 84 facing the opening 82 has a wall surface with no slits. As long as the strength can be secured high enough to hold the wiring harness 76 in the holding member 78, the holding member 78 may be formed so that the bottom 84 has a surface dotted with slits as illustrated in FIG. 5.

The attachment fitting 80 includes a holding member-side attachment fitting 88 and a housing-side attachment fitting 90. The holding member-side attachment fitting 88 is molded integrally with the holding member 78. The housing-side attachment fitting 90 is molded integrally with the small-diameter portion 60 of the housing 40. The holding member-side attachment fitting 88 is provided at one or more positions on the holding member 78. In this embodiment, the holding member-side attachment fittings 88 are provided at two positions on one lateral wall 86. For example, the holding member-side attachment fittings 88 are provided at both longitudinal ends of the holding member 78. The holding member-side attachment fitting 88 is a tubular or columnar protrusion extending from the lateral wall 86 in a direction normal to the lateral wall 86. For example, the holding member-side attachment fitting 88 is formed into an arrowhead or wedge shape.

Hooks 92 are provided at a plurality of positions on the outer peripheral surface of the holding member-side attachment fitting 88. For example, the hooks 92 are provided at two positions opposite to each other across the axial center. Each hook 92 is formed so as to normally protrude radially outward from the body surface of the holding member-side attachment fitting 88. Each hook 92 is deflectable radially inward with respect to the body of the holding member-side attachment fitting 88. For example, each hook 92 extends toward the root of the holding member-side attachment fitting 88 so as to protrude radially outward while being connected to the distal end side of the body of the holding member-side attachment fitting 88. The hook 92 is a protrusion that is necessary to positionally fix the holding member 78 to the housing 40.

A protrusion 94 is provided at one or more positions on each of the two lateral walls 86 of the holding member 78 between which the opening 82 is located. A plurality of protrusions 94 are provided with intervals on each of the two lateral walls 86. For example, the protrusions 94 of the holding member 78 are provided at four positions on each of the two lateral walls 86. Specifically, the protrusions 94 are provided at both longitudinal ends of the holding member 78, and are also provided at two symmetrical positions across the central position in a central area in the longitudinal direction. The protrusions 94 are provided on an inner side of the distal ends of the lateral walls 86 on the opening 82 side, and protrude in a direction in which the opening 82 is closed (that is, a direction in which the open width of the opening 82 is reduced).

The protrusion 94 is formed into such a shape that the wiring harness 76 is easily inserted into the holding member 78 at the time of, for example, manufacturing a vehicle and the inserted wiring harness 76 is less likely to project out of the holding member 78. The protrusion 94 is formed on a plate-shaped deflectable portion 96 that is deflectable outward with respect to the body of the lateral wall 86 of the holding member 78. The deflectable portion 96 has a function of facilitating the insertion of the wiring harness 76 into the holding member 78 at the time of, for example, manufacturing a vehicle.

The housing-side attachment fitting 90 is a plate-shaped flange extending radially outward from the outer peripheral surface of the small-diameter portion 60 of the tubular housing 40. The housing-side attachment fitting 90 is arranged and formed so that the flange surface of the housing 40 expands horizontally. The housing-side attachment fittings 90 are provided as many as the holding member-side attachment fittings 88, and are also provided at positions corresponding to the arrangement positions of the holding member-side attachment fittings 88. An attachment through hole 98 is provided on the flange surface of the housing-side attachment fitting 90. The holding member-side attachment fitting 88 is insertable through the attachment through hole 98. The attachment through hole 98 has a diameter equal to or slightly larger than the outside diameter of the body of the holding member-side attachment fitting 88 and smaller than the diameter of a envelope cylindrical surface of the tops of the hooks 92 formed on the holding member-side attachment fitting 88.

The holding member-side attachment fitting 88 of the holding member 78 is inserted through the attachment through hole 98 of the housing-side attachment fitting 90 of the housing 40 from below the housing-side attachment fitting 90. When the hooks 92 of the holding member-side attachment fitting 88 are engaged with a part of the housing-side attachment fitting 90 around the attachment through hole 98 in the state in which the holding member-side attachment fitting 88 is inserted, the holding member 78 is attached and fixed to the housing 40 while being adjacent to a lower side of the housing-side attachment fitting 90. The holding member 78 is attached and fixed to the housing 40 by using the attachment fitting 80 so that the opening 82 of the holding member 78 is oriented to the front face, that is, the outer face of the housing 40.

When the holding member 78 is attached and fixed, the holding member 78 is arranged so that the distal ends of the two lateral walls 86 on the opening 82 side are located closer to the outer face of the housing 40 and the opening 82 faces the outer face of the housing 40. In this arrangement, the distal ends of the lateral walls 86 on the opening 82 side and the outer face of the housing 40 are not in close contact with each other, and therefore a clearance is formed therebetween. This clearance extends along the longitudinal direction of the steering operation shaft 28, and has a substantially uniform size over the longitudinal direction.

After the holding member 78 is attached and fixed to the housing 40, it is desirable that the wiring harness 76 held by the holding member 78 be securely prevented from projecting out of the holding member 78. From this viewpoint, a size D (that is, a distance between the distal end of the lateral wall 86 on the opening 82 side and the outer face of the housing 40) of the clearance (more specifically, the clearance measured at a part closer to the lateral wall 86 without the holding member-side attachment fitting 88) is preferably smaller than an outside diameter OD of the wiring harness 76.

Figure 11:
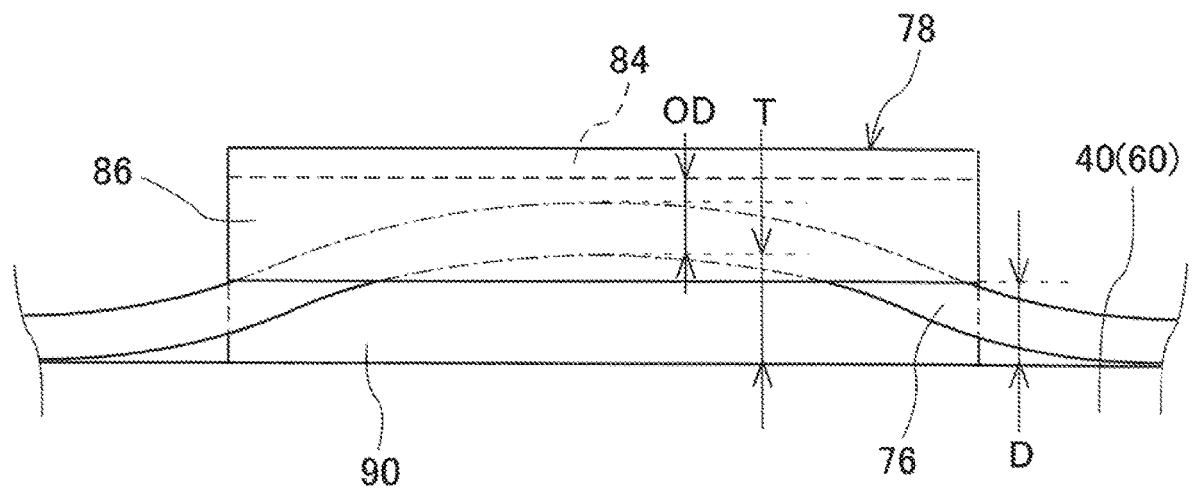
FIG. 11 is a view illustrating a relationship of the arrangement positions of respective portions of the wiring harness fixing structure of the first embodiment.

The wiring harness 76 has flexibility and is therefore deflectable. Thus, the size D of the clearance may be larger than the outside diameter OD of the wiring harness 76 in consideration of the deflection amount within a longitudinal range of the wiring harness 76 that is held by the holding member 78. The reason is as follows. Even if the size D of the clearance is larger than the outside diameter OD of the wiring harness 76, as long as the wiring harness 76 is deflected as illustrated in FIG. 11, any portion within the longitudinal range of the wiring harness 76 that is held by the holding member 78 abuts against the inner wall surface of the lateral wall 86 of the holding member 78. Accordingly, the wiring harness 76 is prevented from projecting out of the holding member 78.

Specifically, the size D of the clearance is set smaller than the sum of the outside diameter OD of the wiring harness 76 and a deflection amount T within the longitudinal range of the wiring harness 76 that is held by the holding member 78. The deflection amount T may be determined based on, for example, the longitudinal length of a part of the wiring harness 76 that is housed in and held by the holding member 78, and the degree of flexibility (that is, the degree of rigidity or the degree of deflection) of the wiring harness 76. The wiring harness 76 is routed along the housing 40 of the apparatus 22 by attaching and fixing the holding member 78 to the housing 40 after the wiring harness 76 is held by the holding member 78.

As described above, in the wiring harness fixing structure 20 of this embodiment, the holding member 78, which is formed into a trough shape with the opening 82 provided on one face and is configured to hold the wiring harness 76, is attached and fixed to the housing 40 by arranging the holding member 78 so that the opening 82 is oriented to the outer face of the housing 40. More specifically, the holding member-side attachment fitting 88 provided on the lateral wall 86 of the holding member 78 so as to protrude from the lateral wall 86 is inserted through the attachment through hole 98 of the housing-side attachment fitting 90 extending radially outward from the outer face of the housing 40, and the hooks 92 of the holding member-side attachment fitting 88 are engaged with the flange surface of the housing-side attachment fitting 90. In this manner, the holding member 78 is attached and fixed so that the opening 82 is oriented to the outer face of the housing 40.

According to the wiring harness fixing structure 20, the wiring harness 76 is surrounded by the bottom 84 and the lateral walls 86 of the holding member 78 and the outer face of the housing 40. Therefore, the wiring harness 76 is housed in the holding member 78 without significantly deflecting and bulging the wiring harness 76. In this manner, the route of the wiring harness 76 can be regulated. Thus, the wiring harness 76 can be prevented from projecting out of the holding member 78 formed into a trough shape from the opening 82 of the holding member 78.

The clearance is formed between the distal end of the lateral wall 86 of the holding member 78 and the outer face of the housing 40. The size D of the clearance is smaller than the sum of the outside diameter OD of the wiring harness 76 and the deflection amount T within the longitudinal range of the wiring harness 76 that is held by the holding member 78. In this structure, when the wiring harness 76 is deflected within the longitudinal range of the wiring harness 76 that is held by the holding member 78, any portion within the longitudinal range may abut against the inner wall surface of the lateral wall 86 of the holding member 78. Accordingly, the wiring harness 76 can securely be prevented from projecting out of the holding member 78.

The holding member 78 is a trough-shaped member extending in the longitudinal direction of the housing 40 and the axial direction A of the steering operation shaft 28 so that the holding member 78 can cover the wiring harness 76 over a certain length in the longitudinal direction. Therefore, the wiring harness 76 can be attached to the housing 40 securely and stably. Thus, the wiring harness 76 can securely be prevented from interfering with, for example, vehicle components around the apparatus 22 or the ground.

When the holding member 78 extending in a trough shape is attached and fixed to the housing 40, it is only necessary that the tubular or columnar holding member-side attachment fitting 88 molded integrally with the holding member 78 be inserted through the attachment through hole 98 of the housing-side attachment fitting 90 molded integrally with the small-diameter portion 60 of the housing 40 and the hooks 92 of the holding member-side attachment fitting 88 be engaged with a part of the housing-side attachment fitting 90 around the attachment through hole 98. Therefore, the number of components can be reduced as compared to the structure in which the wiring harness 76 extending in the longitudinal direction is attached and fixed to the housing 40 by using band type clamps at a plurality of positions. Further, the mounting operation can be simplified when the wiring harness 76 and the holding member 78 are attached and fixed to the housing 40.

In the wiring harness fixing structure 20, the holding member 78 has the protrusions 94 that are provided on the inner side of the distal ends on the opening 82 side and protrude in the direction in which the opening 82 is closed. According to this structure, the protrusions 94 can achieve a state in which the wiring harness 76 held by the holding member 78 is less likely to project out of the holding member 78.

In the wiring harness fixing structure 20, the protrusions 94 may be provided at least at both longitudinal ends of the holding member 78, and may also be provided at least in the central area of the holding member 78 in the longitudinal direction. According to this structure, the wiring harness 76 can be held by using the holding member 78 having the protrusions 94 arranged in conformity with the deflection of the wiring harness 76 in the holding member 78. Accordingly, the wiring harness 76 can securely be prevented from projecting out of the holding member 78.

Modified embodiments of the first embodiment are described below. In the first embodiment described above, as illustrated in FIG. 10, the wiring harness fixing structure 20 includes the holding member 78 configured to hold the wiring harness 76, and the attachment fitting 80 configured to attach and fix the holding member 78 to the housing 40. The attachment fitting 80 includes the holding member-side attachment fitting 88 protruding in a tubular or columnar shape from the lateral wall 86 of the holding member 78, and the housing-side attachment fitting 90 having the flange surface extending radially outward from the outer peripheral surface of the housing 40. The tubular or columnar holding member-side attachment fitting 88 is inserted through the attachment through hole 98 formed on the flange surface of the housing-side attachment fitting 90. In this fixing structure 20, the holding member 78 can be mounted on the housing 40 by arranging the holding member 78 so as to face the flange surface of the housing-side attachment fitting 90 and moving the holding member 78 relative to the housing-side attachment fitting 90 in a direction normal to the flange surface so that the holding member-side attachment fitting 88 is inserted through the attachment through hole 98.

Figure 12:
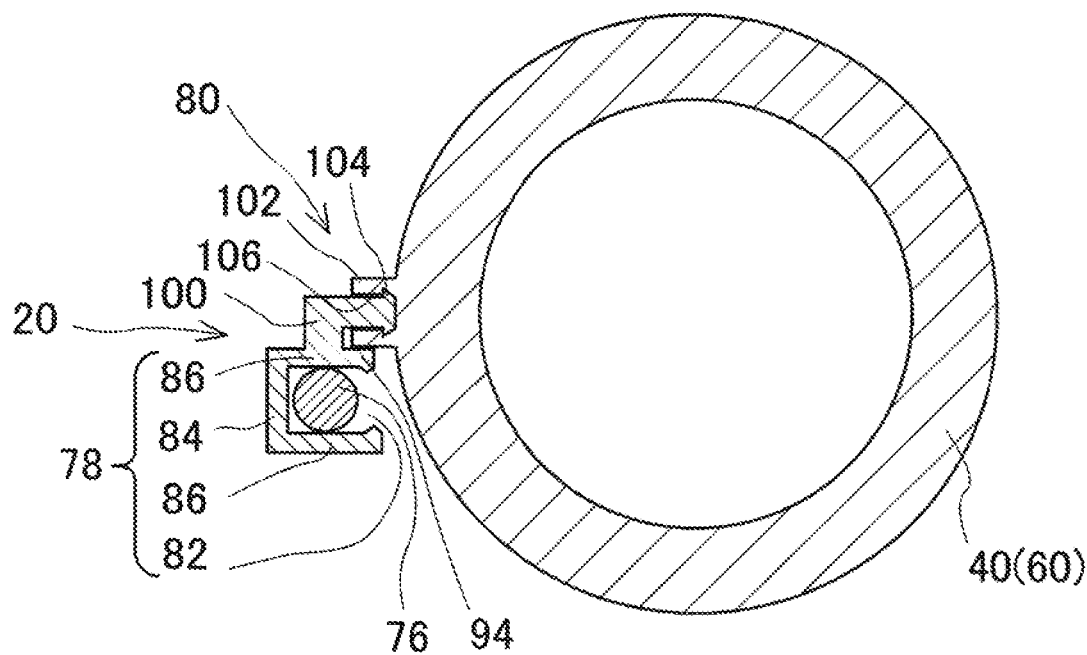
FIG. 12 is a schematic view of a wiring harness fixing structure according to one modified embodiment of the present invention.

The present invention is not limited to the structure described above. As illustrated in FIG. 12, the attachment fitting 80 of the wiring harness fixing structure 20 may include a holding member-side attachment fitting 100 protruding from the lateral wall 86 of the holding member 78 and having an L-shape in cross section, and a tubular housing-side attachment fitting 102 extending radially outward from the outer peripheral surface of the housing 40. A hook 104 may be provided on the outer peripheral surface of a tubular or columnar distal end of the holding member-side attachment fitting 100 having the L-shape in cross section, and a boss hole 106 may be provided in the tubular housing-side attachment fitting 102. The boss hole 106 has a diameter equal to the outside diameter of the tubular or columnar distal end of the holding member-side attachment fitting 100. The boss hole 106 is provided with a large-diameter portion to which the hook 104 is fitted.

In the fixing structure 20 of the first modified embodiment, the holding member 78 can be mounted on the housing 40 by arranging the holding member 78 on a radially outer side of the housing-side attachment fitting 102 and moving the holding member 78 radially inward relative to the housing-side attachment fitting 102 so that the tubular or columnar distal end of the holding member-side attachment fitting 100 is inserted into the boss hole 106 of the housing-side attachment fitting 102.

Figure 13:
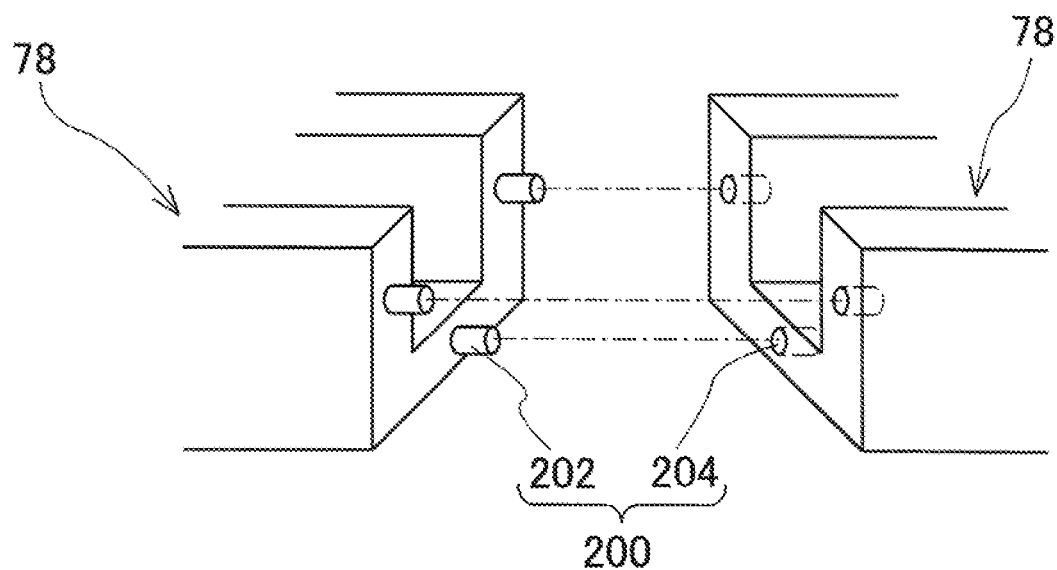
FIG. 13 is a perspective view illustrating a coupling shape to be used for coupling a plurality of holding members provided in a wiring harness fixing structure according to one modified embodiment of the present invention.
Figure 14:
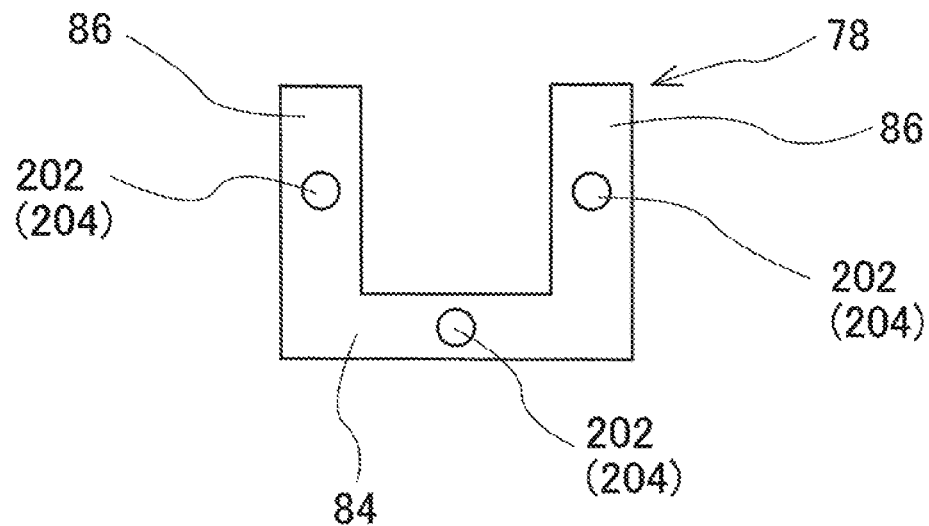
FIG. 14 is a view of the holding member provided in the wiring harness fixing structure illustrated in FIG. 13 when viewed in the longitudinal direction.

Next, a second modified embodiment is described. In the first embodiment described above, the wiring harness 76 is held by the single holding member 78. The present invention is not limited to this structure, and the wiring harness 76 may be held by two or more holding members 78. In this case, as illustrated in FIG. 13 and FIG. 14, each holding member 78 may have a coupling portion 200 configured to couple the holding member 78 to another holding member 78.

In the second modified embodiment, the coupling portion 200 is provided over the longitudinal ends of the holding members 78. The coupling portion 200 includes a projection 202 provided on one longitudinal end face of one holding member 78, and a recess 204 provided on the other longitudinal end face of the other holding member 78. The projection 202 and the recess 204 are formed into such shapes that the projection 202 and the recess 204 are mated with each other and the projection 202 is fitted to the recess 204. A plurality of projections 202 and a plurality of recesses 204 may be provided on the longitudinal end faces. In this case, arrangement of the projections 202 on one longitudinal end face and arrangement of the recesses 204 on the other longitudinal end face are preferably set so that both the holding members 78 can be coupled to each other even when the projections 202 and the recesses 204 are arranged while varying a phase (that is, a rotational arrangement angle about a central axis defined along the axial direction A; for example, 90°, 180°, or 270°). According to the second modified embodiment, the holding members 78 can be coupled to each other while varying the phase.

Figure 15:
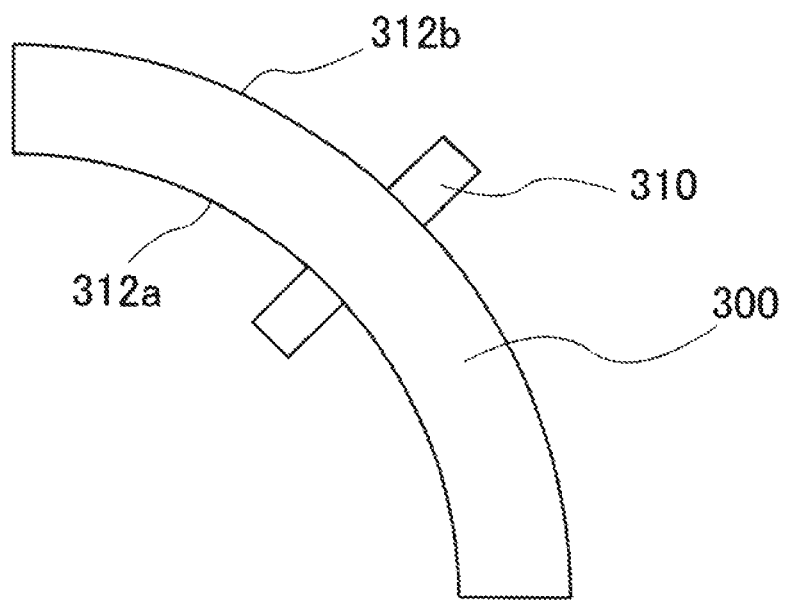
FIG. 15 is a view illustrating a shape of a holding member provided in a wiring harness fixing structure according to one modified embodiment of the present invention.
Figure 16:
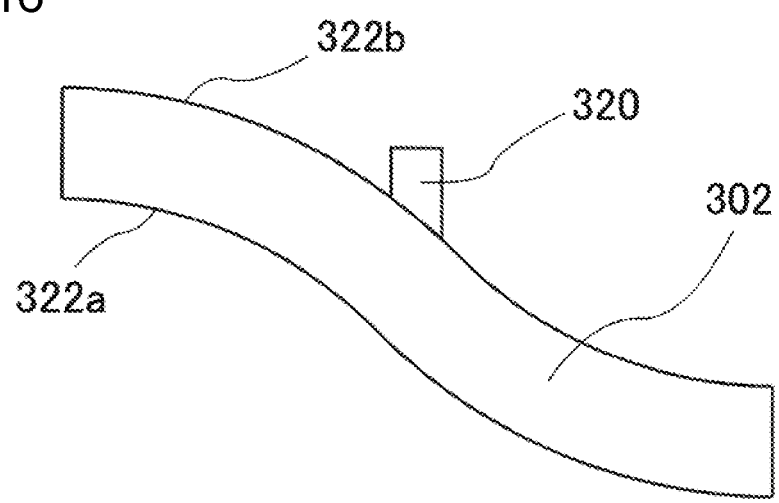
FIG. 16 is a view illustrating a shape of another holding member provided in the wiring harness fixing structure according to the modified embodiment of the present invention.

Next, a third modified embodiment is described. In the first embodiment described above, the holding member 78 is a trough-shaped member extending linearly. The present invention is not limited to this structure, and the holding member may be a trough-shaped member extending in a curved shape. For example, the holding member extending in a curved shape may be a segmented-arc holding member 300 formed into a quarter-arc shape as illustrated in FIG. 15, or an S-shaped holding member 302 as illustrated in FIG. 16. According to the third modified embodiment, the holding member 300 or 302 that holds the wiring harness 76 is allowed to extend along the outer face of the tubular housing 40 while increasing the degree of freedom in terms of routing of the wiring harness 76.

Each of the holding members 300 and 302 according to the third modified embodiment may have a coupling portion similar to the coupling portion 200 configured to couple the holding members 78 to each other according to the second modified embodiment described above. According to this structure, the segmented-arc holding members 300 or the S-shaped holding members 302 can be coupled to each other via the coupling portion. Thus, the holding members 300 or 302 that hold the wiring harness 76 are allowed to appropriately extend along the outer face of the tubular housing 40 while further increasing the degree of freedom in terms of routing of the wiring harness 76.

The present invention is not limited to the structure in which the holding members 78, 300, or 302 of the same type, which are identical in their shapes, are coupled to each other via the coupling portion. The holding members 78, 300, and 302 of different types, which are different in their shapes, may be coupled to each other via the coupling portion. Specifically, any two or more holding members among the straight holding member 78, the segmented-arc holding member 300, and the S-shaped holding member 302 may be coupled to each other in combination in accordance with a desired routing position of the wiring harness 76. That is, the wiring harness fixing structure 20 may be constituted in combination by a plurality of holding members among the holding members 78, 300, and 302 of different types. According to this structure, the holding members 78, 300, and/or 302 that hold the wiring harness 76 are allowed to extend along the outer face of the tubular housing 40 while further increasing the degree of freedom in terms of routing of the wiring harness 76. Thus, the route of the wiring harness 76 can be regulated variously.

In the segmented-arc holding member 300, tubular or columnar holding member-side attachment fittings 310 configured to attach and fix the holding member 300 to the housing 40 are preferably provided on both of an inner face-side lateral wall 312$a$ and an outer face-side lateral wall 312$b$. This is because the holding member 300 can be arranged invertedly while its opening stays oriented to one side. In this case, the holding member-side attachment fitting 310 is preferably provided only at one position in a central area of the quarter arc (that is, a central area in the longitudinal direction) on each of the lateral walls 312a and 312b. This is because the holding member 300 can be arranged invertedly with the simple structure while its opening stays oriented to one side. The holding member-side attachment fitting 310 may be provided at the longitudinal end of the holding member 300.

Two types of S-shaped holding member 302 are preferably provided to variously regulate the route of the wiring harness 76. The first type is a holding member 302 formed into such a shape as to extend from an upper left side to a lower right side when viewed from the opening side. The second type is a holding member 302 formed into such a shape as to extend from a lower left side to an upper right side when viewed from the opening side. In this case, it is only necessary that a tubular or columnar holding member-side attachment fitting 320 configured to attach and fix the holding member 302 to the housing 40 be provided on any one of two lateral walls 322a and 322b of each of the two types of holding member 302. The holding member-side attachment fitting 320 is preferably provided only at one position in a central area of the S-shape (that is, a central area in the longitudinal direction) on the lateral wall 322a or 322b. This is because the holding member 302 is securely attached and fixed to the housing 40 with the simple structure. The holding member-side attachment fitting 320 may be provided at the longitudinal end of the holding member 302.

Other modified embodiments are described. In the first embodiment described above, the plurality of protrusions 94 are provided on the holding member 78 with intervals along the longitudinal direction. The present invention is not limited to this structure, and the protrusion 94 itself of the holding member 78 may extend along the longitudinal direction.

In the first embodiment described above, the wiring harness fixing structure 20 is provided in the apparatus 22 that is an electric power steering system. The present invention is not limited to this structure, and the wiring harness fixing structure 20 may be applied to an apparatus other than the apparatus 22.

The present invention is not limited to the embodiment and the modified embodiments described above, and various modifications may be made without departing from the spirit of the present invention.

What is claimed is:

1. A wiring harness fixing structure, comprising:
a holding member that is formed into a trough shape with an opening provided on one face, a bottom facing the opening, and lateral walls extending from opposite sides of the bottom and is configured to hold a part or all of a wiring harness; and
an attachment fitting configured to attach and fix the holding member to an attachment object so that the opening is oriented to an outer face of the attachment object, wherein
the holding member has protrusions that are provided on an inner side of a distal end of one of the lateral walls on the opening side and protrude inward with respect to a body of the one of the lateral walls on the opening side,
a respective one of the protrusions is provided at each of two longitudinal ends of the holding member, and
each of the protrusions is formed on a deflectable portion of the one of the lateral walls, the deflectable portion being deflectable outward with respect to the body of the one of the lateral walls of the holding member.

2. The wiring harness fixing structure according to claim 1, wherein a distance between a distal end of the holding member on the opening side and the outer face of the attachment object is smaller than a sum of an outside diameter of the wiring harness and a deflection amount within a longitudinal range of the wiring harness that is held by the holding member.

3. The wiring harness fixing structure according to claim 1, wherein an additional one of the protrusions is provided at least in a central area of the holding member in a longitudinal direction.

4. The wiring harness fixing structure according to claim 1, wherein the holding member has a coupling portion that is provided at its longitudinal end and is configured to couple the holding member to another holding member.

5. The wiring harness fixing structure according to claim 4, wherein holding members of the same type or different types are coupled to each other via the coupling portion.

6. The wiring harness fixing structure according to claim 5, wherein the coupling portion couples the holding members of the same type or the different types to each other while varying a phase.

7. The wiring harness fixing structure according to claim 1, wherein the wiring harness fixing structure is constituted by a plurality of holding members of different types in combination.

8. The wiring harness fixing structure according to claim 7, wherein the holding members of the different types are any two or more holding members among a straight holding member, a segmented-arc holding member, and an S-shaped holding member.

9. The wiring harness fixing structure according to claim 1, wherein
the attachment object is a tubular housing configured to house a steering operation shaft of a steering system so that the steering operation shaft is movable in its axial direction, and
the attachment fitting is configured to attach and fix the holding member to an outer face of the housing serving as the attachment object.

* * * * *